Patented Oct. 5, 1937

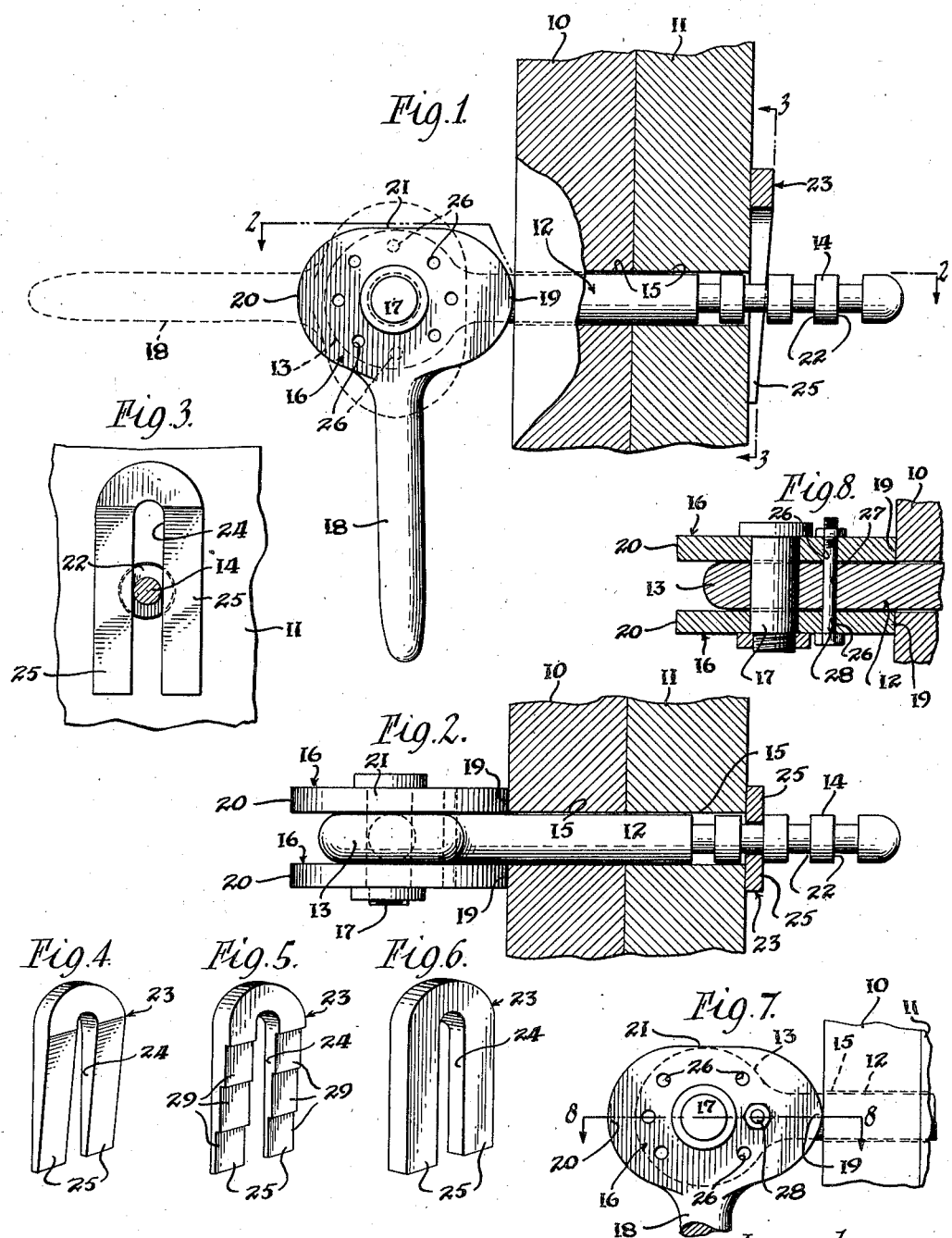

2,094,779

UNITED STATES PATENT OFFICE 2,094,779

CLAMPING DEVICE

Vernon H. Donaldson, Buffalo, N. Y.

Application February 28, 1936, Serial No. 66,316

2 Claims. (Cl. 29—84)

This invention relates to improvements in clamping devices and proposes a device which, although not necessarily limited to such use, can be employed to advantage in connection with the assembling of structural members, the device being available, when employed for this purpose, to hold the said members in the desired relation until they can be secured together permanently in accordance with conventional practice.

One object of the invention is to provide a device which is available for the clamping together of members of varying thicknesses, it being understood that the term "thickness", in this aspect, connotes the distance between those faces of the members which are engaged by the co-operating parts of the device.

A further object is to provide a device which can be applied and removed with facility and without the aid of tools, this object contemplating a construction in which the parts are automatically self-locking as the members are clamped together.

The invention is illustrated in the accompanying drawing in which:

Figure 1 is a view partially in elevation and partially in section of a device embodying the features of the invention, the said device being illustrated in connection with two structural members which are clamped together by it.

Figure 2 is a horizontal section taken along line 2—2 of Figure 1.

Figure 3 is a vertical section taken along line 3—3 of Figure 1.

Figures 4, 5, and 6 are perspective views of one of the parts of the device, the said views illustrating various of the forms which the said part may take.

Figure 7 is a view generally similar to Figure 1 and illustrates the manner in which the parts of the device may be permanently secured against accidental release of the members which are clamped together.

Figure 8 is a section taken along line 8—8 of Figure 7.

The device is illustrated by way of example in connection with structural members 10 and 11 which are to be permanently secured together in any conventional manner as by riveting or welding, the said members being sufficiently indicated for the purpose in view by a showing of those portions which are engaged by the parts of the device. The device, as illustrated, includes a bolt 12 which is formed to provide a head 13 and a shank 14. The latter is inserted through registering openings 15 which are formed in the members 10 and 11, the said bolt being of such a length that the head 13 thereof extends beyond the outer face of the member 10 while the shank 14 extends beyond the outer face of the member 11. The bolt 12 carries spaced discs 16 which are located at opposite sides of the head 13 and which are pivotally connected thereto by a pin 17, the said discs, as illustrated, being formed integrally with and at one end of a lever 18. The discs 16 are similar in shape and each is formed to provide diametrically opposed cam sections 19 and 20. The peaks of the former are located at an angular distance of substantially 90° in a counter-clockwise direction from the lever 18 while the peaks of the latter are located at an angular distance of substantially 90° in the opposite direction, the said cam sections sloping downwardly from said peaks to flat zones 21 which are located diametrically opposite the lever 18.

The outer end of the shank 14 is formed with a series of annular grooves 22, the said series extending a substantial distance toward the head 13 so that one or more of the grooves will be exposed when the shank is inserted through the openings 15. The grooves 22 are formed to accommodate an element 23 which, as illustrated in Figures 1 and 4, is tapered in the direction of its length and is formed with a central slot 24 which provides spaced legs 25. The slot 24 is slightly greater in width than the diameter of the grooved portions of the shank, the said element tapering in thickness from the top (which is of a thickness substantially equal to the width of the grooves) toward the lower ends of the legs 25. The element 23 can, therefore, be slipped over the shank 14 at any one of the grooved portions, the legs of the element straddling the reduced portion of the said shank as best shown in Figure 3.

In the use of the device the shank 14 is inserted through the openings 15, the lever 18 being held so that it forms an extension of the shank 14. As the latter is inserted through the said openings, therefore, the flat zones 21 of the discs 16 can be moved close to or against the outer face of the member 10. The outer end of the shank extends beyond the outer face of the member 11 and hence one or more of the grooves 22 are accessible. The wedge 23 is then moved close to the outer wall of the member 11 and slipped over the shank 14, the legs 25 being directed into the nearest groove. Thereafter the lever 18 is moved either in a clockwise or a counter-clockwise direction. If it is moved in the latter direction, the cam sections 19 engage the outer face of the member 10 and move the said member toward the member 11 (assuming that there is a space between the said members at the time). When the lever 18 is moved to, or slightly beyond, a position in which the peak portions of the cam sections 19 engage the outer face of the member 10, and the element 23 is correctly adjusted so that the members 10 and 11 are clamped tightly against one another, the parts are self-locking, that is to say they will remain in the position to which they are adjusted (see full-line position in Figure 1). If, however, the elevation of the cam sections 19 with respect to the flat zones 21 of the discs is such that the lever 18 cannot be moved to its self-locking position the element 23 is adjusted in the groove to permit the shank 14 to be partially withdrawn from the openings 15, the adjustment of the element being by trial and error and being continued until a position is reached which will enable the members 10 and 11 to be clamped together as described. If the element 23 cannot be adjusted in the groove to a position which will enable the lever to be moved to its self-locking position it is inserted in a groove more remote from the head 13 and adjusted in the latter until the clamping together of the members 10 and 11 and the movement of the lever 18 to a self-locking position are concurrent, the operations described being repeated, if necessary, until the proper groove is selected. On the other hand, if the members 10 and 11 cannot be clamped tightly together when the element 23 is initially inserted in one of the grooves 22 and the lever 18 is moved to a self-locking position and if this cannot be effected by the adjustment of the element in the particular groove, the said element is inserted in a groove closer to the head 13 and is thereafter adjusted in the latter as described. It will be apparent, therefore, that the grooves 22 provide for initial adjustments of a relatively large magnitude while the tapered legs of the element 23 provide for the final fine adjustment, it being obvious that after the proper groove has been selected the final fine adjustments can be readily made, for example, by performing the following operations in the order named: (1) adjust the element 23 to a position which will enable the lever 18 to be moved to its self-locking position with the peak portions of the cam sections 19 abutting the outer face of the member 10, (2) adjust the element in the groove until it fits tightly between the outer face of the member 11 and the opposite wall of the groove, (3) move the lever 18 away from the self-locking position and force the element further over the shank 14 to move the head 13 slightly toward the outer face of the member 10, (4) and then return the lever 18 to its self-locking position. During this final movement of the said lever the members 10 and 11 will be forced tightly against one another. The construction described has the advantage that the pressure which the parts are caused to exert upon the said members can be varied in accordance with the requirements of the particular assembling operations.

When the lever 18 is moved in a clockwise direction the cam sections 20 are utilized, the said cam sections co-operating with the outer face of the member 10 in substantially the same manner as the cam sections 19. The peak portions of the cam sections 20 engage the member 10 when the lever 18 is moved to, or slightly beyond, an angular position substantially 90° from that indicated in dotted lines in Figure 1 and are self-locking in such position. The elevation of the peak portions of the cam sections 20 (with respect to the flat zones 21) is preferably half that of the peak portions of the cam sections 19, although the relative elevations may be varied if desired. The construction described has the advantage that the lever 18 is movable to either of two self-locking positions (each of which corresponds to a different cam elevation) after each adjustment of the element 23. The number of such adjustments which may be necessary to clamp the members 10 and 11 together in the manner described, is, therefore, substantially reduced.

In order that the lever 18 may be permanently secured in its self-locking positions, as well as in other positions, the discs 16 are formed with holes 26 which are located equidistant from the axis of the pin 17 and which can be moved to register with a hole 27 formed in the head 13 (Figure 8), certain of the holes 26 registering with the hole 27 during movement of the lever 18 to utilize the cam sections 19 and other of the holes 26 registering with the hole 27 when the cam sections 20 are employed. The lever may be secured in any position in which the holes 26 register with the hole 27 by a bolt 28 or other suitable fastening means. It will be apparent, therefore, that the lever 18 can be permanently secured in either of its self-locking positions as well as in adjacent positions in which portions of the cam sections 19 and 20, other than the peak portions, are utilized in clamping the members 10 and 11 together.

Modified forms of the element 23 are shown in Figures 5 and 6. The legs of the element shown in the latter figure are of a uniform thickness throughout their length and hence are not available for fine adjustments in the position of the bolt 12. This type of element, however, is preferable when the thicknesses of the members 10 and 11 are uniform and predetermined and when the only adjustments necessary are provided by the grooves in the shank 14. In the embodiment shown in Figure 5 the legs of the element 23 are stepped to provide sections 29 which increase progressively in thickness from the open end of the slot toward the closed end, the element in this case being movable in each groove to provide a predetermined series of adjustments.

I claim as my invention:

1. A device of the character described including a bolt which is of a length greater than the width of the members to be clamped together and which extends beyond the opposite sides of said members, one end of said bolt being formed to provide a shoulder, an element which fits over said bolt between said shoulder and one of said members, a cam carried by the opposite end of said bolt, said cam having peak portions of relatively different elevations, each of which is co-operative with the other of said members and a lever for moving said cam to utilize either of said peak portions to force said members together, said cam being movable to a self-locking position as said members are clamped together by either of said peak portions.

2. A device of the character described including a bolt which is of a length greater than the width of the members to be clamped together and which extends beyond the opposite sides of said members, one end of said bolt being formed to provide a shoulder, an element which fits over said bolt between said shoulder and one of said members, a cam carried by the opposite end of said bolt, said cam having peak portions of relatively different elevations, each of which is co-operative with the other of said members and a lever for moving said cam to utilize either of said peak portions to force said members together, said cam being movable to a self-locking position as said members are clamped together by either of said peak portions, said element varying in thickness in the direction of its length and being adjustable in such direction, whereby to enable use of the device in connection with members of different thicknesses.

VERNON H. DONALDSON.